S. B. HYATT.
DIRECTION SIGNAL.
APPLICATION FILED MAY 13, 1919.
1,332,497.
Patented Mar. 2, 1920.
2 SHEETS—SHEET 1.
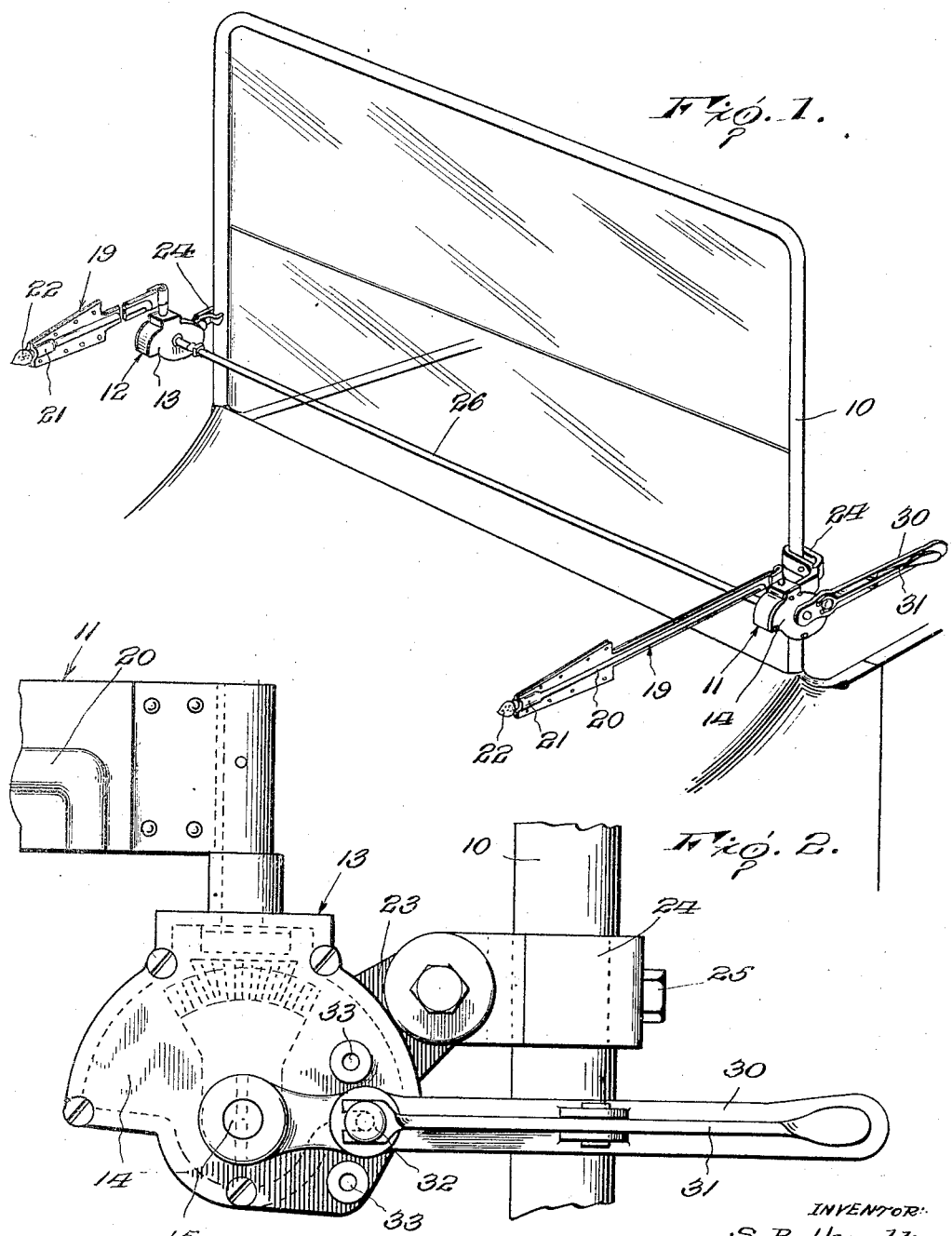

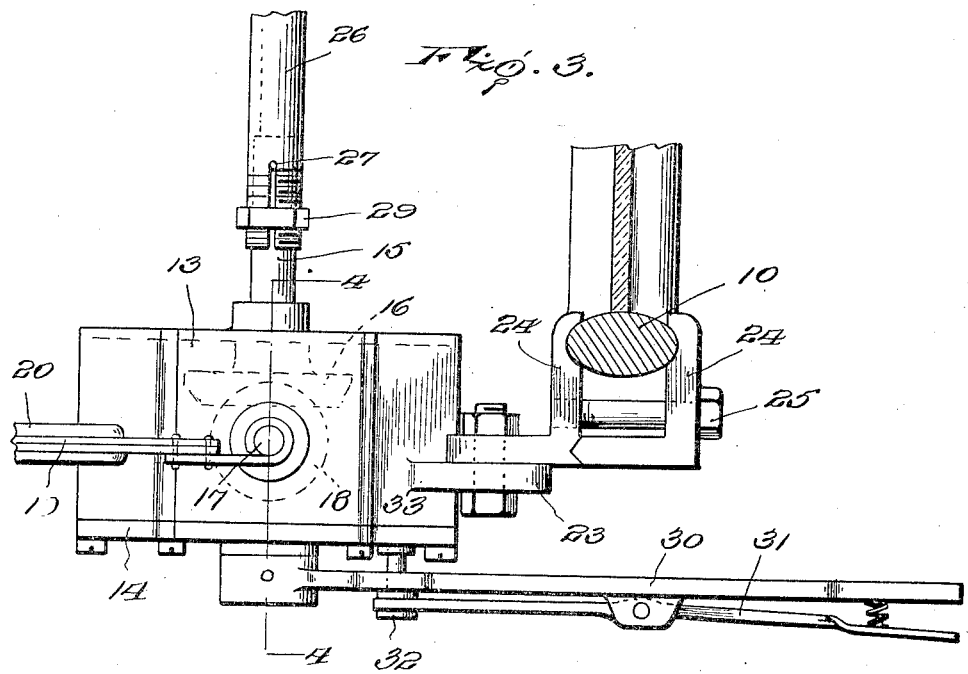
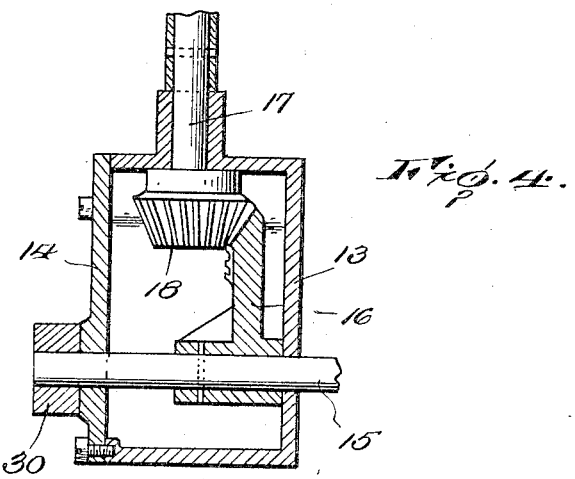

UNITED STATES PATENT OFFICE.

SETH B. HYATT, OF PUEBLO, COLORADO.

DIRECTION-SIGNAL.

1,332,497.  Specification of Letters Patent.  Patented Mar. 2, 1920.

Application filed May 13, 1919. Serial No. 296,833.

*To all whom it may concern:*

Be it known that I, SETH B. HYATT, citizen of the United States, residing at Pueblo, in the county of Pueblo and State of Colorado, have invented certain new and useful Improvements in Direction-Signals, of which the following is a specification.

This invention relates to an improved direction signal for motor vehicles and has as one of its principal objects to provide a device of this character wherein companion signaling devices will be employed and wherein said devices may be mounted at opposite sides of a vehicle so that when the devices are operated for giving a signal, the signal will be visible at each side of the vehicle and consequently be readily visible to traffic both at the right and left as well as in the front and rear of the vehicle.

A further object of the invention is to provide a direction signal wherein the signaling devices will be mounted at the front of the vehicle and will be in sight of the driver so that the driver may accordingly always be sure that the signaling devices are properly operating.

And the invention has as a still further object to provide an arrangement wherein the companion signaling devices may be simultaneously operated with ease and facility from the driver's seat.

Other and incidental objects will appear hereinafter. In the accompanying drawings:

Figure 1 is a fragmentry perspective view showing a conventional type of motor vehicle equipped with my improved signal, Fig. 2 is a fragmentary elevation of the signaling device at the right of Fig. 1, Fig. 3 is a fragmentary plan view of said signaling device, and Fig. 4 is a detail sectional view taken on the line 4—4 of Fig. 3 and looking in the direction of the arrows.

In order that the construction, mounting and operation of my improved signal may be accurately understood I have, in the drawings, shown the signal in connection with a conventional type of motor vehicle having a wind shield 10. In carrying the invention into effect, I employ companion signaling devices each indicated as a whole by the reference numerals 11 and 12 respectively. These signaling devices are very similar in construction and each includes a casing 13 closed by a removable cover plate 14. Journaled through this cover plate and the inner side wall of the casing is a stub shaft 15 to which is fixed within the casing a gear segment 16. At its upper side, the casing is formed with an upstanding boss and journaled through this boss is a signal shaft 17 to the lower end of which is fixed within the casing a pinion 18 coacting with the gear segment. Bent around the upper end portion of the shaft 17 and preferably fixed thereto by a suitable locking pin, is a plate and riveted or otherwise secured to this plate is a signal arm 19. The signal arm preferably resembles the shape of an arrow and is formed of coacting mating plates riveted or otherwise secured together and pressed out medially to provide a conduit 20 extending longitudinally of the arm and, as particularly shown in Fig. 2, opening at its inner end through the lower edge of the arm. At the outer end of the arm or, in other words, at the tip of the arrow head of the arm, the conduit terminates in an electric light socket 21 in which is removably fitted an electric lamp 22. Extending from the casing at its rear side is a rearwardly projecting lug 23 and swingingly adjustable upon this lug is an attaching clamp formed of mating coacting clamp members 24 each substantially angular shaped. One of the clamp members is, as particularly shown in Fig. 3, connected at its inner end to the lug. The other clamp member is arranged to abut at its inner end with the first member which is formed with a substantially V-shaped slot to receive the similarly shaped terminal upon the inner end portion of the free member. Adjustably connecting the outer end portions of the clamp members is a bolt 25. Thus, the clamp members may be fitted at their outer ends around opposite sides of the frame of the wind shield 10 when the bolt 25 may be adjusted for tightly binding the clamp members in engagement therewith.

As particularly shown in Fig. 1, one of the signaling devices is mounted at each end of the wind shield to project forwardly therefrom and connecting the stub shafts 15 of said devices is a transverse coupling rod 26. As shown in detail in Fig. 3, the coupling rod is fitted at its ends over the inner ends of the stub shafts while the stub shafts are equipped with pins 27 engaging in suitable slots in the ends of the coupling rod, the end portions of said rod being split, Threaded upon the coupling rod at its ends are clamp nuts 29 acting to tightly bind the split ends of said rod in engagement with the stub shafts. The signaling devices will thus be actively coupled together to operate simultaneously and fixed upon the outer end of the stub shaft of the signaling device 11 is an operating lever 30 for both the signaling devices. This operating lever 30 projects rearwardly toward the driver's seat of the vehicle and carries a spring pressed latch. This latch includes a pivoted spring actuated latch lever 31, formed at its inner end with a fork engaging a headed locking pin 32 slidable through the inner end portion of the lever. The cover plate of the signaling device 11 is, as particularly shown in Fig. 2, provided with a series of sockets 33 and, as will be understood, the pin is adapted to selectively engage in these sockets.

Normally, the lever 30 will be arranged in a horizontal position when the locking pin 32 will be engaged in the intermediate one of the notches 33 for securing the signal arms fixed pointing, as shown in Fig. 1, straight ahead. However, assuming that the driver should desire to signal an intention to turn to the right, the latch of the lever is released when the lever is depressed and the locking pin engaged in the lowermost of the notches 33. The signal arms will thus be swung through an arc of substantially ninety degrees so that the arm of the signaling device 11 will project laterally beyond the vehicle at the right thereof while the arm of the signaling device 12 will extend in front of the wind shield pointing toward the right. Thus, all traffic adjacent the vehicle will be able to observe either one signal arm or the other and thus be apprised of the impending change in direction of the vehicle. In order to signal an intention to turn to the left, the lever 30 is elevated and the locking pin 32 engaged in the uppermost of the notches 33. The signal arm of the signaling device 12 will then project laterally beyond the vehicle at the left thereof while the arm of the signaling device 11 will project in front of the wind shield pointing toward the left. As in the former instance, all traffic adjacent the vehicle will thus be able to observe either one signal arm or the other and govern their movements accordingly.

I therefore provide an exceedingly efficient type of signal and a signal which may be very easily attached to the wind shield of substantially any conventional type of motor vehicle. However, it will, of course, be understood that where this is impossible, the signaling devices may be connected to any other suitable part or parts of the vehicle. The actuating lever 30 is so located that the signal may be readily operated from the driver's seat and by mounting the signaling devices in front of the driver, the driver may always make sure that the signal is properly operating. Suitable electric conductors may be run from a convenient source of electrical energy upon the vehicle through the conduits 20 to the lamps 22 and by interposing an appropriate switch in circuit with the lamps, the lamps may, at night, be easily lighted so that the signal will thus prove equally as effective at night as in the day time.

Having thus described the invention, what is claimed as new is:

1. A vehicle signal including a casing, an indicator carried by the casing, a shaft carried by the casing and having connection with said indicator, a lever connected to said shaft, a spring actuated latch pivoted intermediate its ends to said lever and provided at its forward end with a locking pin slidably extending through said lever, said housing being provided with a plurality of sockets adapted to receive said locking pin for securing said indicator in an adjusted position.

2. A vehicle signal including a casing, an indicator associated with the casing and adapted for movement about a vertical axis, a shaft carried by the casing and having connection with said indicator, a lever connected to said shaft, a latch pivoted intermediate its ends to said lever, and having its ends terminating adjacent the ends of said lever, and a locking device carried by the forward end portion of said latch and the adjacent portion of said casing and adapted for securing said indicator in an adjusted position.

3. A vehicle signal including a pair of housings, a vertical stub shaft carried by each housing, an indicator carried to each stub shaft, an operating shaft extending horizontally through each housing, a pinion connected to each stub shaft, a gear segment connected to each operating shaft and in mesh with the adjacent pinion, a lever connected to one of said operating shafts, means carried by said lever for securing said indicators in adjusted positions, and means to connect said operating shafts whereby the same are rotated in unison.

In testimony whereof I affix my signature.

SETH B. HYATT. [L. S.]